US006996989B2

(12) United States Patent
Dries et al.

(10) Patent No.: US 6,996,989 B2
(45) Date of Patent: Feb. 14, 2006

(54) PROCESS TO RECOVER ENERGY FROM HOT GAS

(75) Inventors: Hubertus Wilhelmus Albertus Dries, Amsterdam (NL); Andreas Ekker, Amsterdam (NL); Evert Wesker, Amsterdam (NL)

(73) Assignee: Shell Oil Company, Houston, TX (US)

( * ) Notice: Subject to any disclaimer, the term of this patent is extended or adjusted under 35 U.S.C. 154(b) by 76 days.

(21) Appl. No.: 10/486,320

(22) PCT Filed: Aug. 6, 2002

(86) PCT No.: PCT/EP02/08806

§ 371 (c)(1),
(2), (4) Date: Feb. 9, 2004

(87) PCT Pub. No.: WO03/013694

PCT Pub. Date: Feb. 20, 2003

(65) Prior Publication Data

US 2004/0200204 A1 Oct. 14, 2004

(30) Foreign Application Priority Data

Aug. 10, 2001 (EP) ................................. 01203066

(51) Int. Cl.
*F02C 1/00* (2006.01)

(52) U.S. Cl. ....................................... 60/650; 60/39.12

(58) Field of Classification Search ............... 60/39.12, 60/772, 780, 39.182, 650
See application file for complete search history.

(56) References Cited

U.S. PATENT DOCUMENTS

| | | | |
|---|---|---|---|
| 2,753,925 A | 7/1956 | Campbell et al. | |
| 3,577,958 A * | 5/1971 | Narita | 122/7 R |
| 3,777,486 A | 12/1973 | Damratowski | |
| 3,855,788 A | 12/1974 | Damratowski | |
| 3,912,464 A | 10/1975 | Schulz | |
| 4,036,294 A * | 7/1977 | Ecker | 165/154 |
| 4,292,050 A | 9/1981 | Linhardt et al. | |
| 4,424,766 A | 1/1984 | Boyle | |
| 5,060,913 A | 10/1991 | Reid | |
| 5,643,354 A * | 7/1997 | Agrawal et al. | 75/490 |
| 5,759,495 A | 6/1998 | Hyppanen | |
| 5,891,214 A | 4/1999 | Innes et al. | |
| 6,044,977 A | 4/2000 | Csendes | |
| 6,116,169 A * | 9/2000 | Miyoshi et al. | 110/216 |

FOREIGN PATENT DOCUMENTS

| | | |
|---|---|---|
| DE | 2710153 | 9/1978 |

(Continued)

OTHER PUBLICATIONS

International Search Reported mailed Nov. 27, 2002.

*Primary Examiner*—Ted Kim
(74) *Attorney, Agent, or Firm*—Charles W. Stewart

(57) ABSTRACT

A process to recover energy from a gas having a temperature of above 650° C. and an absolute pressure of more than 1.7 bar and having non-solidified alkali containing compounds and particles by performing the following steps:
(a) cooling the gas to a temperature of below 550° C. by means of a shell-tube heat exchanger, wherein the hot gas is passed at the shell side and coolant water is passed at the tube side, wherein steam is formed, from which steam energy is recovered;
(b) separating the particles from the gas by means of one or more sequentially arranged centrifugal separation devices to a dust level of below 400 mg/$Nm^3$; and
(c) expanding the gas in an expander to recover energy.

26 Claims, 1 Drawing Sheet

FOREIGN PATENT DOCUMENTS

Figure 1:
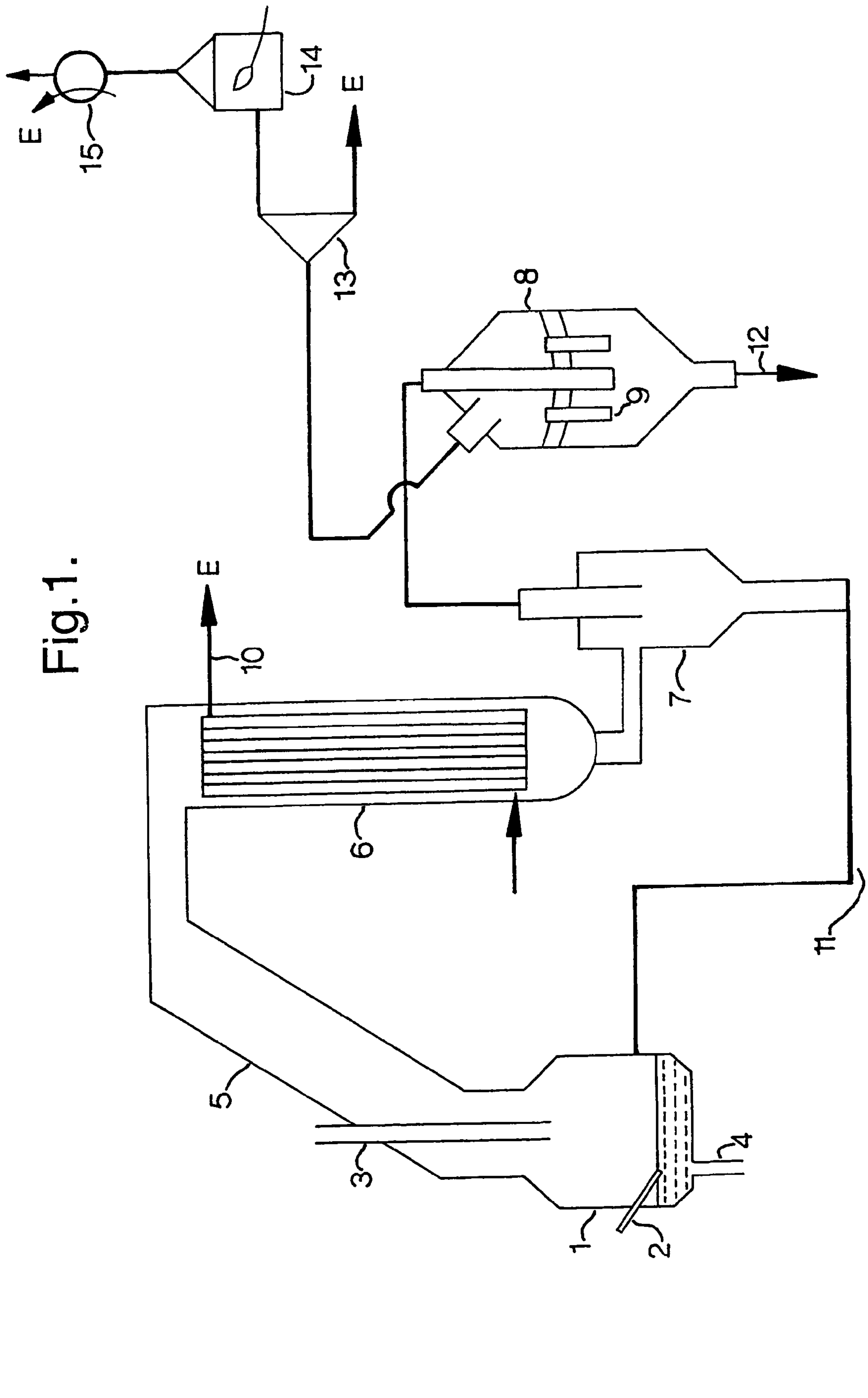

| | | |
|---|---|---|
| DE | 4200685 | 7/1993 |
| EP | 0254379 | 10/1990 |
| EP | 0342767 | 11/1992 |
| EP | 0722999 | 7/1996 |
| GB | 1411136 | 10/1975 |
| NL | 8101446 | 11/1981 |

* cited by examiner

PROCESS TO RECOVER ENERGY FROM HOT GAS

Process to recover energy from a gas having a temperature of above 650° C. and an absolute pressure of more than 1.7 bar and comprising both solid and not-yet-solidified alkali containing compounds and particles. Such a gas is for example produced in recently developed continuous iron making and steel making process, such as the HI smelt process.

Steel is an iron-base alloy containing less than about 1% carbon and commonly other alloying elements. Steel is presently manufactured from blast furnace pig iron ("hot metal"), DRI (direct reduced iron) and scrap iron and steel. DRI, also referred to as sponge iron, is produced by solid state direct reduction of iron ore.

The conventional separate unit operations of steel making-batch by-product coke ovens, continuous iron making blast furnaces and batch steel making furnaces have dominated the industry for the past one hundred years. Aside from important increases in the size and efficiency of the apparatus employed, there have been only two major changes in this period: the ubiquitous application of tonnage oxygen to enrich or replace process air, and the use of agglomerated, heat indurated, high grade iron mineral concentrates to supplement or replace natural lump iron ore.

In recent years, for increasingly compelling reasons of burdensome capital and operating costs, and because of the need for environmental protection, there has been a sharp increase in continuous iron making and steel making process research and development. Such smelting reduction methods are for example described in U.S. Pat. Nos. 5,891,214, 5,759,495 and 5,060,913. The coal-based COREX continuous iron making process operates commercially, but it is dependent on lump iron-rich feed and on a satisfactory market for the large volume of export gas it produces. Currently, leading infant continuous processes are for example processes referred to as HIsmelt, DIOS and Romelt (trademarks). All of these processes are devoted to iron making, which overcome the disadvantages of the blast furnace process. These new processes are high intensity, coal-based, in-bath smelting processes treating iron ore fines.

The oxygen supplied to HIsmelt is primarily air preheated to 1200° C. Iron ore fines, coal and flux are bottom-injected using nitrogen as carrier gas. A high velocity, high mass flow, hot air blast is injected through a single top tuyere. The bath is highly turbulent, and the metal and slag produced are separated externally. The relatively short, horizontal smelting furnace is round in cross-section. Its off-gas passes to a circulating fluidized bed to capture entrained droplets and dust before being further used downstream. The DIOS process comprises a circulating fluidized bed, pre-reduction furnace linked to a smelting furnace similar to a tall L-D oxygen converter. Furnace feed consists of partially reduced fine iron ore, coal, oxygen, and flux. The furnace is bottom-stirred using nitrogen, and operates at 2 atmospheres gauge. The Romelt process employs submerged injection of oxygen-enriched air for smelting of iron ore fines directly introduced with coal into a large volume, violently splashing fluid slag bath.

The above processes will produce very large volumes of hot gas containing carbon monoxide, hydrogen, dust and compounds, which are originally present in the iron ore and the coal. Examples of such contaminants are alkali compounds such as sodium and potassium. These compounds are in a liquid or gaseous state at temperatures of above 775° C. At lower temperatures these alkalis will condensate and subsequently solidify onto the surface of process equipment and dust particles present in the gas. The alkalis may for example solidify in the form of NaCl, KCl, $Na_2CO3$ and $K_2CO_3$. The formation of such condensing and solid salts makes it difficult to just simply cool the gas and recover the heat. A method of treating the hot gas is by cooling with evaporating water. The advantage of such a method is that the alkali compounds may be recovered as an aqueous solution before they can cause any fouling of any downstream process equipment. A disadvantage is that the aqueous solution, containing also dust and possibly coal particles, has to be treated before it can be disposed into the environment. Furthermore such a method is not an efficient method of recovering energy from the hot gas.

In U.S. Pat. No. 4,424,766 a hydro-pressurised fluidised bed combustor for coal combustion is described. A tubular heat exchanger is positioned in the freeboard of the fluidised bed combustor vessel.

In U.S. Pat. No. 6,044,977 an apparatus is described for removing microparticulates from a gas. The purified gas is fed out for utilization in driving a gas turbine for electrical power generation or other purpose.

There is thus a need for a process wherein the temperature of the hot gas can be greatly reduced, while the problems associated with the solidification of the alkali compounds is reduced. The present invention provides a process wherein the above-described problems are overcome and energy is recovered in a more efficient manner.

The following process achieves this object. Process to recover energy from a gas, obtained from a smelting reduction process used to continuously prepare steel, having a temperature of above 650° C. and an absolute pressure of more than 1.7 bar and comprising non-solidified alkali containing compounds and particles by performing the following steps:

(a) cooling the gas to a temperature of below 550° C. by means of a shell-tube heat exchanger, wherein the hot gas is passed at the shell side and coolant water is passed at the tube side, wherein steam is formed, from which steam energy is recovered, and wherein the shell-tube heat exchanger comprises a membrane wall positioned in an elongated vessel, which elongated membrane wall is open at either side for gas to enter and leave the inner part of the space surrounded by said membrane wall, which inner space is provided with a plurality of heat exchanging tubes, which tubes are interconnected at their exterior in a group wise manner and positioned in said inner space such that a plurality of channels for passage of hot gas exist, which passages run parallel to the elongated walls of the membrane wall, (b) separating the particles from the gas by means of one or more sequentially arranged centrifugal separation devices to a dust level of below 400 $mg/Nm^3$, (c) expanding the gas in an expander to recover energy.

The hot gas used in step (a) will have a temperature of above 650° C., especially more than 800° C. The upper temperature may be 1000° C. The pressure of the hot gas will be above 1.7 and more preferably above 1.9 bar absolute (bara). This minimum pressure is required to achieve a sufficient energy recovery in step (c). The absolute pressure may be up to 40 bara. The hot gas will contain solid particles. These solid particles may for example be soot and ash when the hot gas is obtained in a continuous iron smelt process as described above. The present process is best suited to be used starting with a hot gas comprising more than 0.5 $g/Nm^3$ of particles. Preferably the hot gas contains more than 5 $g/Nm^3$ particles. This is advantageous to achieve a minimum self-cleaning effect of the gas flowing through the shell-tube heat exchanger of step (a). There is no practical upper limit to the amount of particles present in the hot gas. Suitable hot gasses as obtained in the above referred to continuous iron making processes will usually have a content of particles of less than 100 $g/Nm^3$.

The hot gas will also comprise alkali compounds. Typical examples of non-solidified alkalis are sodium and potassium. The content of sodium is preferably between 0.02–0.08 vol % and the content of potassium is preferably between 0.02–0.1 vol %. The hot gas may also contain carbon monoxide and hydrogen if the hot gas is obtained under not completely combustion conditions. The content of carbon monoxide may be between 10 and 30 vol % of the hot gas. The hydrogen content may be between 5 and 15 vol %. An example of a hot gas having the above composition is the flue gas as obtained in the above referred to smelting reduction processes, as for example the COREX, HIsmelt, DIOS and Romelt process.

It has been found that by using the shell-tube heat exchanger of step (a) a sufficient temperature reduction is possible while at the same time fouling of the heat exchanger, due to solidification of alkalis, is avoided. Fouling is avoided as much as possible because the gas flows at the shell side of the heat exchanger. The shell-tube heat exchanger is preferably designed having a relatively high heat-exchanging surface. In use the gas will flow at a relatively low gas velocity through the shell side of the heat exchanger. It has been found that part of the fouling is removed from the surfaces of the heat exchanger by the self-cleaning power from the particles present in the hot gas. Nevertheless some fouling is expected to occur and therefore the surface of the heat exchange tubes will have to be cleaned by preferably mechanical rappers. Examples of such rappers are described in DE-A-2710153 and EP-A-254379.

The shell-tube heat exchangers comprise a membrane wall having for example a tubular or rectangular box like form. The membrane wall is preferably positioned in an elongated vessel. The tubes of the membrane wall preferably run parallel to the elongated side of said wall. The elongated membrane wall is open at either side for gas to enter and leave the inner part of the space surrounded by said membrane wall. This inner space is provided with a plurality of heat exchanging tubes. These tubes are interconnected at their exterior in a group wise manner and positioned in said inner space such that a plurality of channels for passage of hot gas exist. These passages run preferably parallel to the elongated walls of the membrane wall. For example when a tubular membrane wall is used the inner tubes may be arranged in a plurality of concentric tubular formed groups of spiral tubes. The tubes of one tubular group are suitably interconnected. The passages for hot gas will be the annular spaces between said tubular groups of tubes. When an elongated rectangular box like membrane wall is used the groups of interconnected tubes may be flat walls of tubes positioned parallel in the box like space. The passage for hot gas will then have an elongated box like shape. Preferably each group of tubes and the membrane wall is provide with a separate rapper means. Because the tubes of each individual group of tubes are inter-connected the number of rapper means to clean each group can be limited.

Cooling water preferably runs counter-current through the tubes in the different groups and through the tubes of the membrane wall runs with the hot gas. Groups of tubes may also be used to further heat saturated steam to obtain super heated steam.

Examples of suitable heat-exchanger which can find application in step (a) are described in EP-A-342767. More preferably a heat-exchanger is used wherein the above referred to gas passages are arranged in such a manner that, in operation, the velocity of the gas flowing through the said gas passages, is kept substantially constant. It has been found that there is only a small gas velocity range wherein the gas has a sufficient self-cleaning effect to reduce fouling at the one hand and a minimal equipment erosion effect on the other hand. By reducing the cross-sectional area of the gas passages in the heat-exchanger in the downstream direction a substantially constant gas velocity can be maintained in said passages. An example of a preferred heat exchanger having such reduced gas passages is described in EP-A-722999, which publication is incorporated herein by reference.

In step (a) the temperature is reduced to a temperature below 550° C. and preferably below 520° C. Because at these low temperatures most non-solidified alkalis are present as solids it is not necessary to reduce the temperature to very low levels. From an energy recovery viewpoint it is preferred that the temperature of the gas leaving step (a) is at least 500° C. From the steam or optionally super heated steam energy can be recovered by means of a steam turbine.

In step (b) solid particles are removed from the gas by means of one or more sequentially arranged centrifugal separation devices to a dust level of below 400 $mg/Nm^3$. These solid particles will comprise solidified alkali compounds and the dust which was originally present in the hot gas. The dust level of the gas as obtained in step (b) is preferably lower than 350 $mg/Nm^3$ and more preferably lower than 280 $mg/Nm^3$. In addition to this requirement the amount of coarse dust, particles having a mean diameter of more than 10 microns, is preferably less than 5 and more preferably less than 2 $mg/Nm^3$. The dust levels needs to be lowered in step (b) to prevent erosion of the expansion turbine as used in step (c).

The centrifugal separator which is preferably used in step (b) can be any known separator which separates solids from a gas by making use of centrifugal forces and which claims to reduce the level of dust to the desired level. Preferably the separation is performed by means of a cyclone separator in step (b), more preferably by means of a so-called axial entry cyclone. Such cyclone comprise two concentric tubes, the inner tube serving as a gas outlet and vortex finder and the outer tube serves as a swirl chamber in which the particles are centrifugal held against the wall and away from the vortex. The tangentially velocity is impaired to the gas feed by means of swirl vanes located between the inner and outer tube. The inner tube protrudes partly the outer tube from above. Solids are removed at the lower end of the outer tube. Preferably the separator comprises a plurality of such tubes operating in parallel. Examples of such separators are well known and are described in for example GB-A-1411136. A commercial example is the Shell Third stage separator as for example described in Hydrocarbon Processing, January 1985, pages 51–54. Variations of such separators are shown as a figure in Perry (see below) in FIG. 20.98. If the level of particles in the hot gas leaving step (a) is more than 1 $g/Nm^3$ and especially more than 10 $g/Nm^3$ a pre-separation is preferably performed before the gas is fed to a separator as described above. Such a rough separation is preferably performed by means of a standard tangential inlet cyclone as for example described in Perry's Chemical Engineers' handbook, 5th edition, 1973, McGraw-Hill Inc., page 20–83 to 20–85. The level of particles is preferably reduced to below 1 $g/Nm^3$.

In a preferred embodiment part or all of the relative coarse particles, which may comprise combustionable material and which are separated from the gas in the above described rough separation of step (b), are recycled to the process, especially the above referred to smelting reduction processes, which generates the hot gas. The smaller particles, as separated in the final separation step of step (b), for example by means of the Shell Third Stage Separator, will contain relatively more alkali deposits than the coarse particles. Advantageously these smaller particles are not recycled to said process. Thus a process is obtained wherein no build-up of alkalis will occur while the net amount of solids being produced by the process in step (b) is minimized.

In step (c) the gas stream is passed into a power recovery expander and depressurized, with the energy recovered from the gas stream being used for useful work such as driving a compressor or generating electricity. A bypass system, which diverts the gas stream around the power recovery expander, will normally be employed to prevent over speeding of the expander. These systems are described in for example U.S. Pat. Nos. 3,777,486 and 3,855,788. The power recovery expander and the other equipment required to practice the invention are rather specialized, but are available commercially.

If the feed gas of the process according to the present invention comprises carbon monoxide an additional step (d) is preferably performed. Step (d) comprises the combustion of the carbon monoxide to carbon dioxide. The combustion of CO-containing gas is usually performed under controlled conditions in a separate so-called CO-boiler or combustion device enriched with air and continuously fed with CO-containing gas. The CO-boiler can be equipped to accept at least one other fuel, which is used in start-up, or more commonly to supplement the fuel value of the flue gas. Such processes are well known. Other examples are described in U.S. Pat. No. 2,753,925 wherein the released heat energy from CO-containing gas combustion is employed in the generation of high-pressure steam.

FIG. 1 shows a preferred embodiment of the present invention. FIG. 1 shows an smelting reduction process reactor (1) to which coal, iron ore (2) and oxygen containing gas (3) is fed. Iron is recovered via (4) and a flue gas (5) is produced. The hot flue gas is led via overhead conduit (5) and via a shell-tube heat exchanger (6), a rough cut cyclone (7) to a vessel (8) comprising a plurality of axial entry cyclone separators (9). In heat-exchanger (6) steam is produced and discharged via (10) to an energy recovery facility, which may be an steam turbine. The particles separated in rough cut cyclone (7) are recycled to reactor (1) via (11). The fine, alkali containing, particles separated in vessel (8) are discharged via (12). The hot gas, poor in solids, is fed to expander (13) to produce energy (E). The gas comprising carbon monoxide is fed to a CO boiler (14) wherein energy (E) is recovered in (15).

We claim:

1. A process to recover energy from a hot gas, obtained from a smelting reduction process used to continuously prepare steel, wherein the hot gas has a temperature of above 650° C. and an absolute pressure of more than 1.7 bar and comprising non-solidified alkali containing compounds and particles by performing the following steps:

(a) cooling the hot gas to provide a cooled gas having a temperature of below 550° C. by means of a shell-tube heat exchanger, wherein the hot gas is passed at the shell side of the shell-tube heat exchanger and coolant water is passed at the tube side of the shell-tube heat exchanger, wherein steam is formed, from which steam energy is recovered, and wherein the shell-tube heat exchanger includes an elongated membrane wall formed by a plurality of elongated tubes connected together so as to form the elongated membrane wall, wherein the elongated membrane wall further defines a tubular space having at one end of the tubular space an inlet opening for receiving the hot gas into the tubular space and at an opposite end of the tubular space an outlet opening for discharging the cooled gas from the tubular space, wherein a plurality of heat exchanging tubes providing the tube side of the shell-tube heat exchanger that pass through the tubular space thereby defining a plurality of channels for the passage of the hot gas within the tubular space and between the plurality of heat exchanging tubes, (b) separating the particles from the cooled gas by means of one or more sequentially arranged centrifugal separation devices to a dust level of below 400 mg/Nm3 to give a reduced dust gas, (c) expanding the reduced dust gas in an expander to recover energy.

2. The process according to claim 1, wherein the hot gas used in step (a) has a temperature of above 800° C.

3. The process according to claim 2, wherein the hot gas contains more than 5 g/Nm$^3$ of particles.

4. The process according to claim 3, wherein the hot gas contains between 0.02–0.08 vol % sodium and between 0.02–0.1 vol % potassium.

5. The process according to claim 4, wherein the content of carbon monoxide is between 10 vol % and 30 vol % in the hot gas and the hydrogen content in the hot gas is between 5 vol % and 15 vol %.

6. The process according to claim 5, wherein the plurality of channels is arranged in such a manner that, in operation, the velocity of the hot gas flowing through the plurality of channels is kept substantially constant.

7. The process according claim 6, wherein the temperature of the hot gas is reduced in step (a) to provide the cooled gas having a temperature between 500° C. and 520° C.

8. The process according to claim 7, wherein the dust level of the reduced dust gas as obtained in step (b) is lower than 280 mg/Nm$^3$.

9. The process according to claim 8, wherein the content of particles having a mean diameter of more than 10 microns in the reduced dust gas as obtained in step (b) is less than 5 mg/Nm$^3$.

10. The process according to claim 9, wherein the separation in step (b) is performed by means of an axial entry cyclone.

11. The process according to claim 10, wherein in step (b) a pre-separation is performed if the level of particles in the cooled gas leaving step (a) is more than 1 g/Nm$^3$ and wherein said pre-separation is performed in a tangential inlet cyclone separator.

12. The process according claim 11, wherein the hot gas is obtained in a smelting reduction process and the material which is separated in said pre-separation is recycled to said smelting reduction process.

13. The process according to claim 12, wherein a step (d) is performed when the reduced dust gas as obtained in step (c) comprises carbon monoxide and hydrogen, said step (d) comprising the combustion of the carbon monoxide to carbon dioxide.

14. The process according to claim 1, wherein the hot gas comprises more than 0.5 g/Nm$^3$ of particles.

15. The process according to claim 1, wherein the hot gas contains between 0.02–0.08 vol % sodium and between 0.02–0.1 vol % potassium.

16. The process according to claim 1, wherein the content of carbon monoxide is between 10 vol % and 30 vol % in the hot gas and the hydrogen content in said hot gas is between 5 vol % and 15 vol %.

17. The process according to claim 1, wherein the plurality of channels is arranged in such a manner that, in operation, the velocity of the hot gas flowing through the plurality of channels is kept substantially constant.

18. The process according to claim 1, wherein the temperature of the hot gas is reduced in step (a) to provide the cooled gas having a temperature between 500° C. and 520° C.

19. The process according to claim 1, wherein the dust level of the reduced dust gas as obtained in step (b) is lower than 280 $mg/Nm^3$.

20. The process according to claim 1, wherein the content of particles having a mean diameter of more than 10 microns in the reduced dust gas as obtained in step (b) is less than 5 $mg/Nm^3$.

21. The process according to claim 1, wherein the separation in step (b) is performed by means of an axial entry cyclone.

22. The process according to claim 1, wherein a step (d) is performed when the reduced dust gas as obtained in step (c) comprises carbon monoxide and hydrogen, said step (d) comprising the combustion of the carbon monoxide to carbon dioxide.

23. An energy recovery process, said process comprises:

providing a hot gas generated by an iron smelting reduction process and having a hot gas temperature above 650° C. and a pressure above 1.7 bar, and wherein said hot gas contains a non-solidified alkali compound and solid particles at a solids concentration of more than 0.5 $g/Nm^3$;

cooling said hot gas by use of a shell-tube heat exchanger having a shell side and a tube side by passing said hot gas through said shell side of said shell-tube heat exchanger and passing cooling water through said tube side of said shell-tube heat exchanger and yielding cooled gas from said shell side of said shell-tube heat exchanger and steam from said tube side of said shell-tube heat exchanger, wherein said cooled gas has a cooled gas temperature that is below 550° C. and contains a solidified alkali compound;

passing said cooled gas to a centrifugal separator whereby said solid particles and said solidified alkali compound are removed from said cooled gas to yield a reduced dust level gas having a dust level below 400 $mg/Nm^3$; and recovering energy from said reduced dust level gas by expanding said reduced dust level gas through an expander turbine.

24. An energy recovery process as recited in claim 23, wherein said cooled gas temperature is at least 500° C.

25. An energy recovery process as recited in claim 24, wherein said dust level is lower than 350 $mg/Nm^3$.

26. An energy recovery process as recited in claim 25, wherein said dust level is such that less than 5 mg/Nm3 of the particles in said reduced dust level gas have a mean diameter of more than 10 microns.

* * * * *